US010824553B2

(12) United States Patent
Kojima

(10) Patent No.: US 10,824,553 B2
(45) Date of Patent: Nov. 3, 2020

(54) MEMORY DEVICE THAT CONTROLS TIMING OF RECEIVING WRITE DATA FROM A HOST

(71) Applicant: TOSHIBA MEMORY CORPORATION, Tokyo (JP)

(72) Inventor: Yoshihisa Kojima, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 665 days.

(21) Appl. No.: 15/061,695

(22) Filed: Mar. 4, 2016

(65) Prior Publication Data

US 2016/0313921 A1 Oct. 27, 2016

Related U.S. Application Data

(60) Provisional application No. 62/152,225, filed on Apr. 24, 2015.

(51) Int. Cl.

| | |
|---|---|
| ***G06F 12/00*** | (2006.01) |
| ***G06F 12/02*** | (2006.01) |
| ***G06F 3/06*** | (2006.01) |

(52) U.S. Cl.

CPC .......... *G06F 12/0246* (2013.01); *G06F 3/061* (2013.01); *G06F 3/0656* (2013.01); *G06F 3/0671* (2013.01); *G06F 2212/1016* (2013.01); *G06F 2212/1028* (2013.01); *G06F 2212/214* (2013.01); *G06F 2212/7203* (2013.01); *G06F 2212/7205* (2013.01); *Y02D 10/13* (2018.01)

(58) Field of Classification Search

CPC ............. G06F 12/0246; G06F 12/0253; G06F 2212/7205

See application file for complete search history.

(56) References Cited

U.S. PATENT DOCUMENTS

| | | | | |
|---|---|---|---|---|
| 4,750,154 A * | 6/1988 | Lefsky | G06F 5/065 | 365/189.04 |
| 6,380,873 B1 * | 4/2002 | Priborsky | H03M 7/3084 | 235/431 |
| 2005/0022233 A1 * | 1/2005 | Park | G11B 27/034 | 725/32 |

* cited by examiner

*Primary Examiner* — Gurtej Bansal
(74) *Attorney, Agent, or Firm* — Kim & Stewart LLP

(57) ABSTRACT

A memory device includes a nonvolatile memory unit, a write buffer, and a controller. The controller is configured to receive a write command from a host, send a permission signal to the host after the write command is received, receive write data associated with a write command from the host in response to the permission signal, store the write data in the write buffer, and transfer the write data stored in the write buffer to the nonvolatile memory unit. The controller controls a timing of transmitting the permission signal, such that the write buffer is full for no longer than a predetermined length of time.

18 Claims, 10 Drawing Sheets

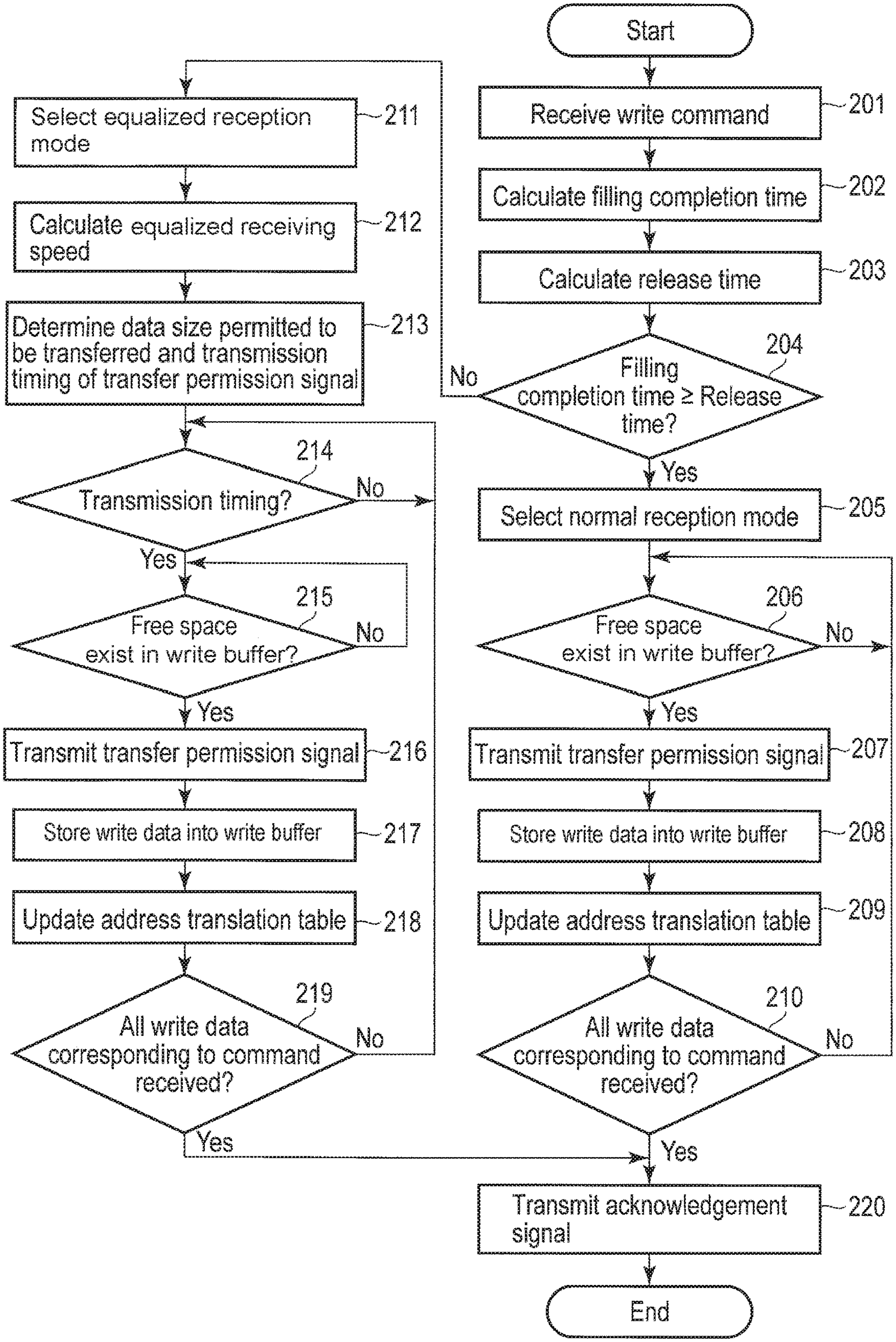
F I G. 2

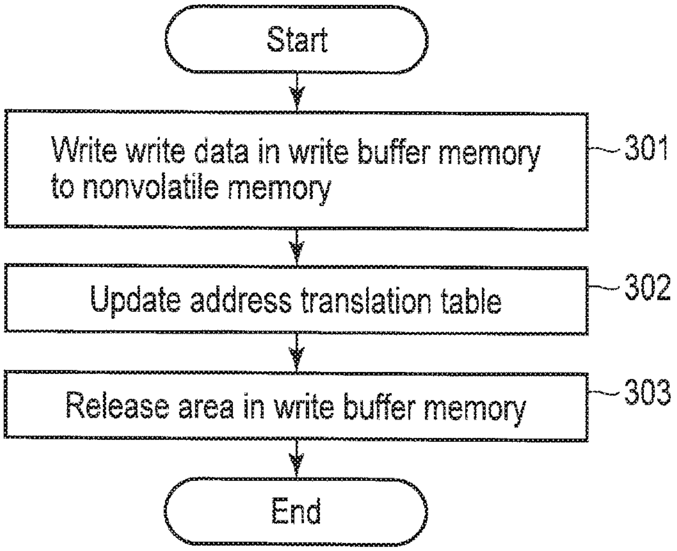
F I G. 3
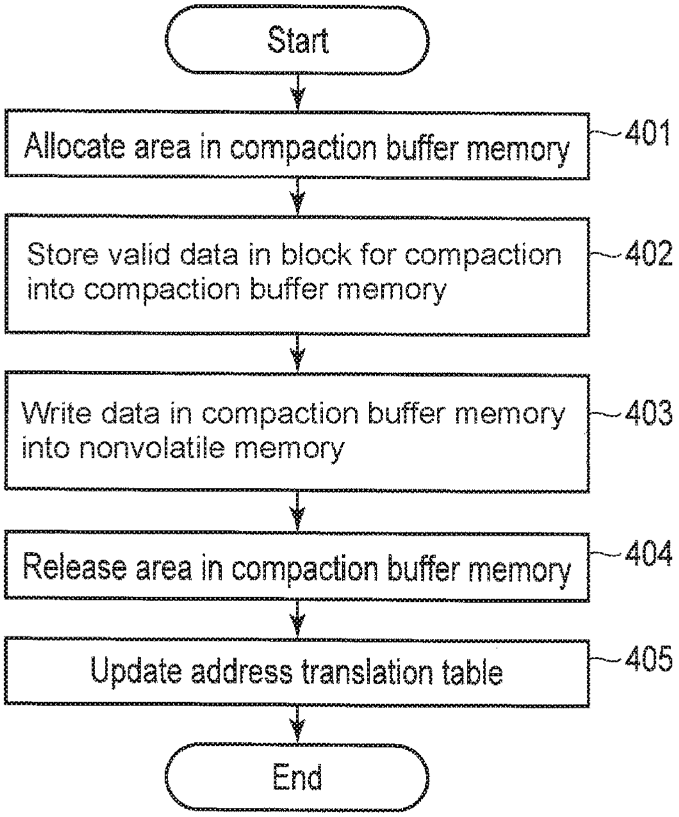
F I G. 4

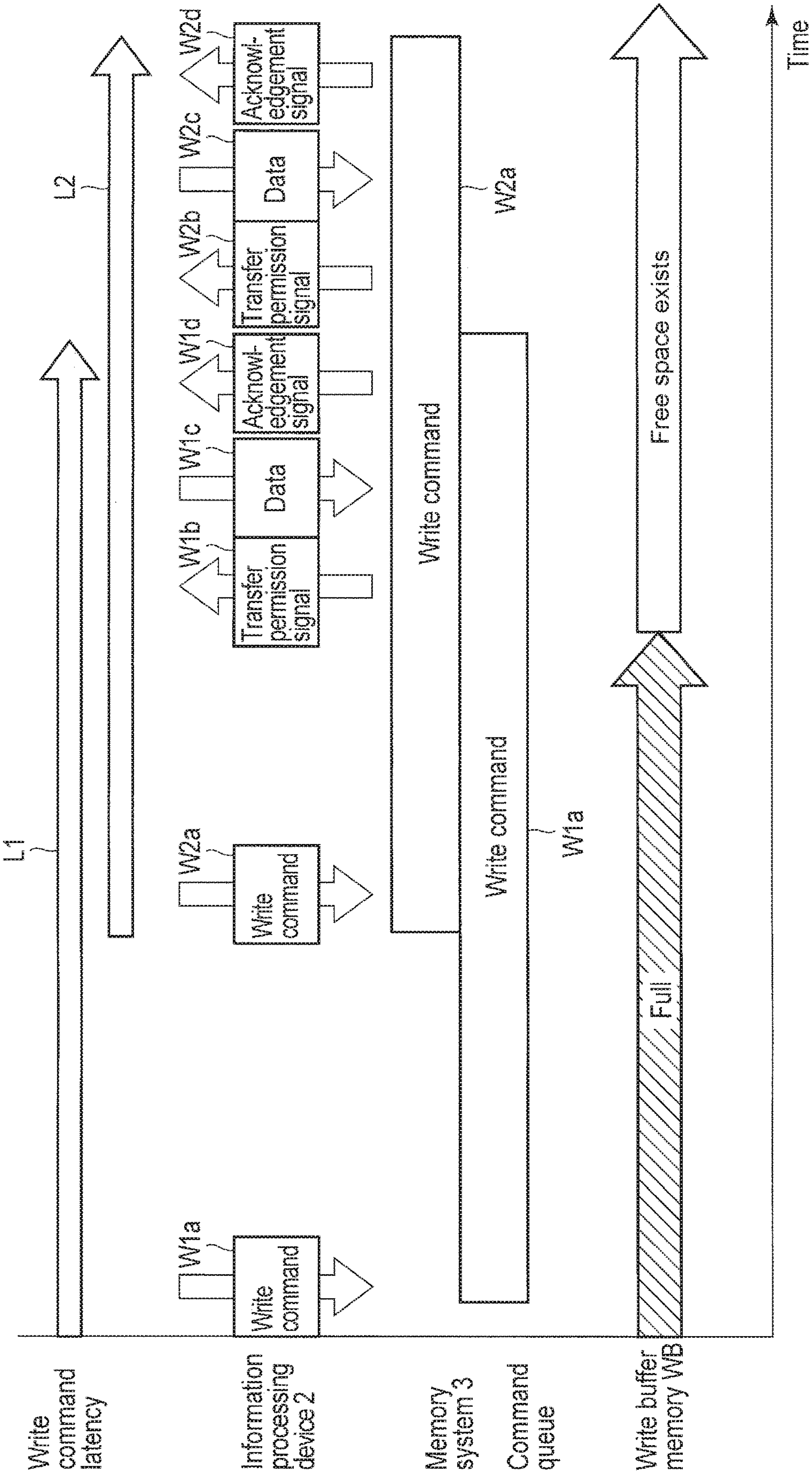
F I G. 6

MEMORY DEVICE THAT CONTROLS TIMING OF RECEIVING WRITE DATA FROM A HOST

CROSS-REFERENCE TO RELATED APPLICATION

This application is based upon and claims the benefit of priority from U.S. Provisional Patent Application No. 62/152,225, filed Apr. 24, 2015, the entire contents of which are incorporated herein by reference.

FIELD

Embodiments described herein relate generally to a memory device including a buffer memory.

BACKGROUND

A solid state drive (SSD) includes a nonvolatile semiconductor memory such as a NAND flash memory. The NAND flash memory includes a plurality of blocks (physical blocks). Each of the plurality of blocks includes a plurality of memory cells formed at crossing points of word lines and bit lines.

BRIEF DESCRIPTION OF THE DRAWINGS

FIG. 2 is a flowchart of a process to store data in a write buffer memory carried out by a memory system according to the first embodiment.

FIG. 3 is a flowchart of a host (host-initiated) writing operation for writing data in the write buffer memory to a nonvolatile memory carried out by the memory system according to the first embodiment.

FIG. 4 is a flowchart of a compaction process carried out by the memory system according to the first embodiment.

FIG. 6 is a timing chart showing write command latency when the write buffer memory is changed from a full state to a state including free space.

DETAILED DESCRIPTION

Figure 1:
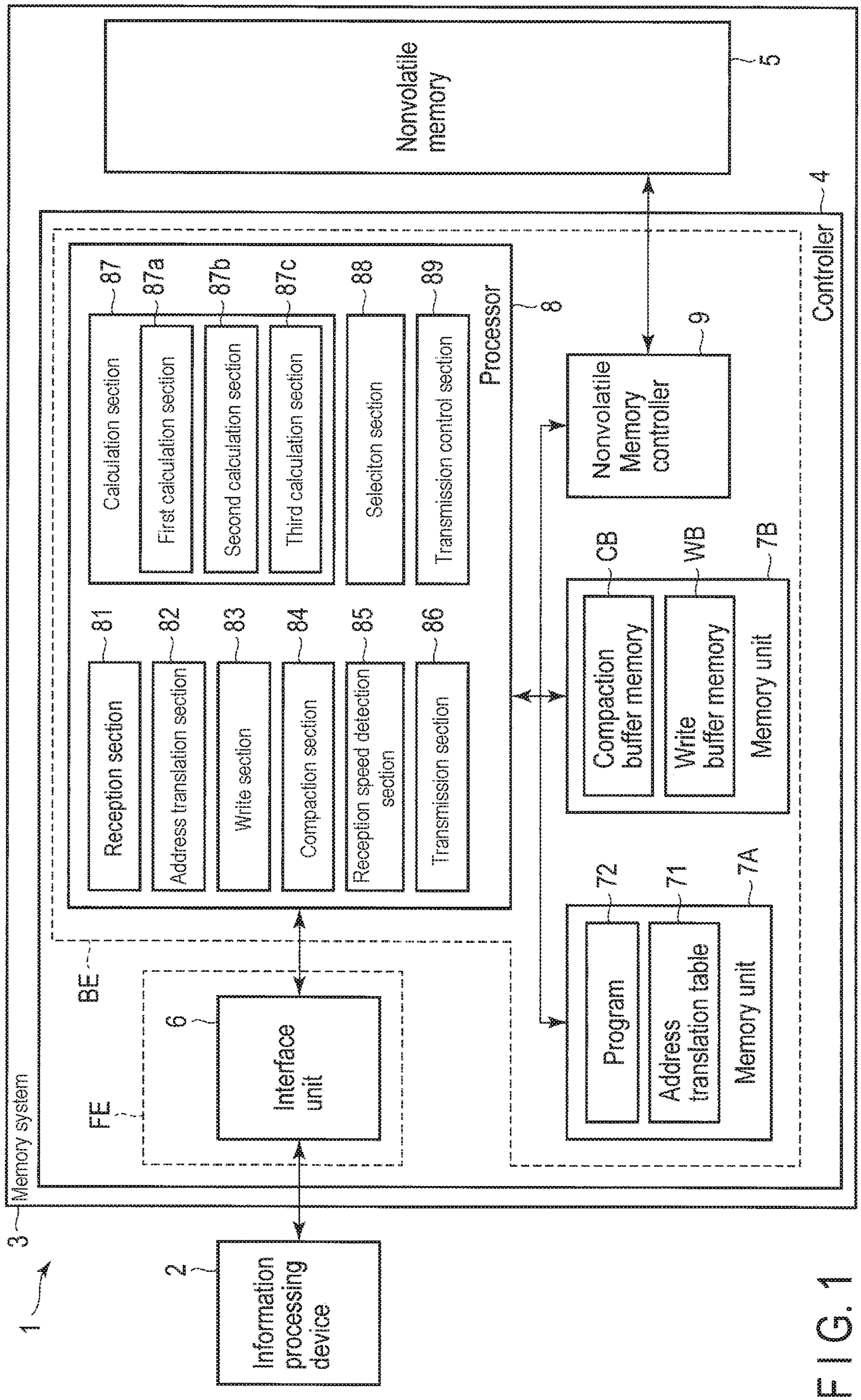
FIG. 1 is a block diagram of an information processing system according to a first embodiment.

In general, according to an embodiment, a memory device includes a nonvolatile memory unit, a write buffer, and a controller. The controller is configured to receive a write command from a host, send a permission signal to the host after the write command is received, receive write data associated with a write command from the host in response to the permission signal, store the write data in the write buffer, and transfer the write data stored in the write buffer to the nonvolatile memory unit. The controller controls a timing of transmitting the permission signal, such that the write buffer is full for no longer than a predetermined length of time.

Embodiments will be described hereinafter with reference to drawings. In the following description, the same reference numerals denote components having nearly the same functions and configurations, and a repetitive description thereof will be given if necessary.

First Embodiment

In a first embodiment, a memory system that is directed to decrease variation in write command latency is described.

A memory system according to the present embodiment is, for example, a memory device such as an SSD. However, the memory system according to the present embodiment may be a variety of memory devices such as a memory card, a hard disk drive (HDD), a hybrid type memory device including an HDD and an SSD, or an optical disk. The memory system has an interface which is similar to that of a HDD, when the memory system is an SSD.

The memory system includes a nonvolatile memory. In the present embodiment, the nonvolatile memory is a NAND flash memory. However, the nonvolatile memory may include other types of memories such as, for example, a NOR flash memory, a magnetoresistive random access memory (MRAM), a phase change random access memory (PRAM), a resistive random access memory (ReRAM), or a ferroelectric random access memory (FeRAM).

In the nonvolatile memory, data is erased by an erase unit. The erase unit includes a plurality of writing units and reading units. When the nonvolatile memory is a NAND flash memory, the erase unit corresponds to a block including a plurality of pages. The write unit and the read unit correspond to a page.

In the present embodiment, access means both writing data to a memory and reading data from a memory.

In the present embodiment, free space of a buffer memory refers to an area of the buffer memory in which new data can be stored.

In the present embodiment, a capacity of a buffer memory refers to a remaining space of the buffer memory which can be stored in the buffer memory.

In the present embodiment, a time refers to, for example, a certain moment in the passage of time, and may be expressed by different terms such as a timing and a time point.

In the present embodiment, a period refers to, for example, a time period from a certain time to a different time. In other words, a period refers to the length of time.

FIG. 1 is a block diagram of an information processing system according to the present embodiment.

An information processing system 1 includes an information processing device 2 and a memory system 3. In the present embodiment, the information processing device 2 operates as a host device of the memory system 3.

In the present embodiment, a host (host-initiated) writing operation is defined as an operation of writing, to a nonvolatile memory 5, data received from the information processing device 2 and temporarily stored in a write buffer memory WB. In the present embodiment, the host writing operation is different from, for example, a compaction writing operation with respect to the nonvolatile memory 5 and an operation of writing management data, such as an address translation table 71, into the nonvolatile memory 5. The compaction writing operation is a part of a compaction process.

The memory system 3 may be included in the information processing device 2. Alternatively, the information processing device 2 may be communicably connected to the memory system 3 through a network, etc. The memory system 3 may be communicably connected to a plurality of information processing devices 2. A plurality of memory systems 3 may be communicably connected with one or more information processing devices 2.

The memory system 3 includes a controller 4 and the nonvolatile memory 5.

The controller 4 includes an interface unit 6, memory units 7A and 7B, a processor 8, and a memory controller 9. The controller 4 may be divided into, for example, a front end FE which includes an interface for transmitting and receiving data, information, signal, command, address, etc., to/from the information processing device 2, and a back end BE which does not includes the interface. For example, the front end FE includes the interface unit 6. For example, the back end BE includes memory units 7A and 7B, the processor 8, and the memory controller 9.

The interface unit 6 transmits and receives data, information, signal, command, address, etc., to/from an external device such as the information processing device 2.

The memory unit 7A stores an address translation table 71 which associates a logical address of write data received from the information processing device 2 with a physical address of memory unit 7B or the nonvolatile memory 5, and a program 72 executed by the processor 8. The address translation table 71 is, for example, a look-up table (LUT). The address translation table 71 and the program 72 may be partially or entirely stored in another memory such as a memory in the processor 8. The program 72 may be, for example, a firmware, an application program, or an operating system.

The memory unit 7A is, for example, a nonvolatile memory. However, the memory unit 7A may be partially or entirely a volatile memory such as a dynamic random access memory (DRAM) or a static random access memory (SRAM). When the memory unit 7A includes a volatile memory, a program or data stored in the volatile memory may be written to a nonvolatile memory such as the nonvolatile memory 5 upon power down of the memory system 3.

The memory unit 7B is used as, for example, a working memory, and includes the write buffer memory WB and a compaction buffer memory CB.

The write buffer memory WB is a buffer memory which temporarily stores write data received from the information processing device 2. The compaction buffer memory CB is a buffer memory which temporarily stores valid data at the time of the compaction process.

In the present embodiment, valid data are data referred to by the address translation table 71. An example of valid data is data for which, after a logical address and write data corresponding to the logical address are received with a write command to the memory system 3 from the information processing device 2, no write command designating an address range including the identical logical address (no command for overwriting write data corresponding to the previous write command) is received from the information processing device 2. In other words, for example, the latest data is valid data when data corresponding to the same logical address are stored in the buffer memory, or written to a plurality of locations in the nonvolatile memory.

The memory unit 7B may be a volatile memory, a nonvolatile memory, or a combination of a nonvolatile memory and a volatile memory.

The processor 8 controls the entire memory system 3. The processor 8 executes the program 72 in order to function as a reception section 81, an address translation section 82, a write section 83, a compaction section 84, a receiving speed detection section 85, a transmission section 86, a calculation section 87, a selection section 88, and a transmission control section 89. In the present embodiment, a part of or all of the reception section 81, the address translation section 82, the write section 83, the compaction section 84, the receiving speed detection section 85, the transmission section 86, the calculation section 87, the selection section 88, and the transmission control section 89 may be implemented in the memory system 3 as hardware units.

The reception section 81 receives a command, logical address, data size, and write data from the information processing device 2 via the interface unit 6.

The write section 83 stores write data in the write buffer memory WB when the write data are received by the reception section 81.

The write section 83 executes a host writing operation for transferring data in the write buffer memory WB to the nonvolatile memory 5 via the memory controller 9.

When write data is stored in the write buffer memory WB, the address translation section 82 updates the address translation table 71, which stores a logical address of write data in association with a physical address of the write buffer memory WB in which the write data is stored.

When data in the write buffer memory WB is transferred to the nonvolatile memory 5, the address translation section 82 updates the address translation table 71, which stores the logical address of the data in association with a physical address of the nonvolatile memory 5 to which the data is transferred.

When data in the nonvolatile memory 5 is moved to a destination through a compaction process, the address translation section 82 updates the address translation table 71, such that a logical address of moved data is associated with a physical address of the destination.

The compaction section 84 executes compaction. In other words, the compaction section 84 collects valid data from a plurality of blocks in the nonvolatile memory 5, writes collected data to one block, and generates an unused writable block in the nonvolatile memory 5, that is, a free block.

In the present embodiment, compaction refers to processing of transferring valid data to another area in a memory and increasing a consecutive writable area.

For example, the compaction section 84 selects, as compaction target blocks, a plurality of blocks in which the amount of valid data is less than or equal to a predetermined value. The compaction section 84 temporarily stores, in the compaction buffer memory CB, the valid data in the selected blocks. The compaction section 84 selects a free block as a destination block of the valid data. In the free block, all data have been invalidated, and no valid data are written. The compaction section 84 writes the valid data in the compaction buffer memory CB to the destination block.

Instead of the compaction section 84, a garbage collection unit which executes garbage collection may be used.

In the present embodiment, garbage collection refers to processing of releasing an unnecessary area in a memory.

When the nonvolatile memory 5 is a NAND flash memory, it is necessary to erase a block for releasing an unnecessary area in the memory. Therefore, valid data in a garbage collection target block is moved to another block. When the nonvolatile memory 5 is a NAND flash memory, both compaction and garbage collection are usually performed.

The receiving speed detection section 85 detects receiving speed of data from the information processing device 2 by the memory system 3. In the present embodiment, the receiving speed detection section 85 detects average receiving speed. The average receiving speed is, for example, the amount of data received per unit time. For example, the receiving speed detection section 85 detects the amount of data stored in the write buffer memory WB within a predetermined period and calculates the average receiving speed. The receiving speed detection section 85 may calculate, for example, receiving speed of particular data for only detecting receiving speed without being written into the nonvolatile memory 5.

As described above, in the present embodiment, an example of a data reception state of data transferred from the information processing device 2 to the memory system 3 is the average receiving speed. Alternatively, the data reception state may be, for example, at least information related to data transfer from the information processing device 2 to the memory system 3, or at least information for determining reception of write data. For example, the reception state may be: a median value or mode value of the receiving speed; a statistical value based on the number of transferred data items, a data size and a transfer period; a history of the amount of reception data; or data including data reception timing and the reception amount of data. Thus, the data reception state may be appropriately determined.

When a write command is received by the reception section 81, the transmission section 86 transmits, to the information processing device 2, which is a write command source, a signal indicating permission for the information processing device 2 to transfer write data (hereinafter, referred to as a transfer permission signal), via the interface unit 6 based on an instruction of the transmission control section 89. The transfer permission signal includes the size of the write data permitted to be transferred. When write data received by the reception section 81 via the interface unit 6 is stored in the write buffer memory WB, the transmission section 86 transmits, to the information processing device 2, an acknowledgement signal indicating that processing of the write command has been completed, based on an instruction of the transmission control section 89.

The calculation section 87 includes a first calculation section 87*a*, a second calculation section 87*b*, and a third calculation section 97*c*.

Based on the data reception state of write data and the data storage state of the write buffer memory WB, the first calculation section 87*a* calculates time when the write buffer memory WB becomes full.

A full state means that no free space is left in the write buffer memory WB after the write data received from the information processing device 2 is stored in the write buffer memory WB. For example, a full state means that the remaining space of the write buffer memory WB is less than a first threshold (for example, zero), or means that the amount of data stored in the write buffer memory WB exceeds a second threshold (for example, the maximum data amount allowed to be stored).

In the present embodiment, filling means that data is stored in the write buffer memory WB. Filling completion means that the write buffer memory WB becomes full as a result of storing data in the write buffer memory WB. In other words, the filling completion refers to a state where data cannot be stored in the write buffer memory WB any more.

The data storing state of the write buffer memory WB may at least include information indicating whether or not more data can be stored in the write buffer memory WB. For example, the data storage state may include the size of the remaining space of the write buffer memory WB, or may include the amount of data stored in the write buffer memory WB and the second threshold.

More specifically, the first calculation section 87*a* calculates the filling completion time (first time) of the write buffer memory WB when no free space is left after data is filled in the write buffer memory WB, based on: the receiving speed of data from the information processing device 2 detected by the receiving speed detection section 85; and the size of the remaining space of the write buffer memory WB, or the amount of data stored in the write buffer memory WB and the second threshold. For example, the receiving speed corresponds to a performance (throughput) in which the memory system 3 receives data from the information processing device 2.

For example, the first calculation section 87*a* divides the size of free space of the write buffer memory WB by the receiving speed and calculates the time period until the write buffer memory WB becomes full. Then, for example, the first calculation section 87*a* calculates the filling completion time when filling of data in the write buffer memory WB is completed, based on the current time and the calculated time period until the write buffer memory WB becomes full.

The second calculation section 87*b* calculates the release time when the host writing operation for transferring data in the write buffer memory WB to the nonvolatile memory 5 is executed, thereby generating free space in the write buffer memory WB. Here, releasing means that free space for storing next write data is generated in the write buffer memory WB by transferring data temporarily stored in the write buffer memory WB to the nonvolatile memory 5.

More specifically, for example, the second calculation section 87*b* calculates the release time (second time) of the write buffer memory WB when free space is generated in the write buffer memory WB by transferring data to nonvolatile memory 5 which is a host writing operation, based on a ratio (gear ratio or frequency ratio) of the number of the host writing operations to the number of compaction operations within a predetermined period, and a throttling setting. Here, throttling means, for example, controlling the nonvolatile memory 5 so as to be used in a state having some more available capacity instead of being used at the maximum performance level. By conducting the throttling, reduction of power consumption, performance stabilization, optimization of temperature, and extension of life duration of the memory system 3 may be achieved.

For example, when the gear ratio (frequency ratio) is 1:2, two compaction processes (e.g., one-page writing per one compaction process) are executed for one writing (e.g., one-page writing per one writing process) from the write buffer memory WB to the nonvolatile memory 5 in a cycle. The second calculation section 87*b* adds an execution period until data stored in the write buffer memory WB is written to the nonvolatile memory 5 and execution periods of two compaction processes, and calculates a period (write period) from start time of previous data writing to start time of the next data writing.

For example, when the throttling is performed, the second calculation section 87*b* modifies the write period so as to be lengthened by multiplying the write period by a throttling parameter or adding an additional period to the data write interval; in other words, adding a throttling parameter (wait period) to the data write interval.

Here, the additional period is at least margin time for preventing use of hardware of the memory system 3 at the maximum performance level.

For example, based on time of the last writing and the write period, the second calculation section 87*b* calculates the release time when the write buffer memory WB is released.

When an equalized reception mode is selected as a reception mode, the third calculation section 87*c* calculates an equalized receiving speed of write data to be written to the write buffer memory WB. The equalized receiving speed is a receiving speed at which the period during which the write buffer memory WB is full is less than or equal to a third threshold (predetermined period). As described in detail below, for example, when the third threshold is set to zero, the transmission control section 89 controls transmission of a transfer permission signal, such that the period in which the write buffer memory WB is full is zero.

More specifically, the third calculation section 87*c* calculates the equalized receiving speed by dividing the size of the free space of the write buffer memory WB by a period from the current time to the release time of the write buffer memory WB calculated by the second calculation section 87*b*.

In the present embodiment, for example, when a plurality of operation manners is present and can be switched to each other, each of the operation manners is referred to as a mode. Specifically, in the present embodiment, the mode can be switched at least between the equalized reception mode and a normal reception mode.

In the present embodiment, equalized reception means, for example, controlling transmission timings of transfer permission signals for receiving data, such that data reception timings and data reception amounts are substantially equally distributed.

The selection unit (determination unit) 88 compares the filling completion time with the release time and determines whether or not the period in which the write buffer memory WB is full is less than or equal to the third threshold. When the period in which the write buffer memory WB is full is not less than or equal to the third threshold, the selection section 88 selects the equalized reception mode. Specifically, the selection section 88 compares the filling completion time calculated by the first calculation section 87*a* with the release time calculated by the second calculation section 87*b* and selects a reception mode.

For example, when the filling completion time and the release time of the write buffer memory WB are the same, or the release time is earlier than the filling completion time, the selection section 88 selects the normal reception mode as the reception mode. In other words, the selection section 88 selects the normal reception mode when the selection section 88 determines that the write buffer memory WB is not full before the next host writing to the nonvolatile memory 5 and free space is always present in the write buffer memory WB.

For example, the selection section 88 selects the equalized reception mode as the reception mode when the filling completion time is earlier than the release time of the write buffer memory WB. In other words, the selection section 88 selects the equalized reception mode when the selection section 88 determines that the write buffer memory WB is full before the next host writing to the nonvolatile memory 5 and a wait state occurs before free space for storing the write data to the write buffer memory WB is allocated.

As a modification example, the normal reception mode may be selected when the release time is earlier than the filling completion time. The equalized reception mode may be selected when the filling completion time is the same as the release time or earlier than the release time. Thus, the equalized reception mode may be selected such that the period in which the write buffer memory WB is full is zero or is shortened.

Based on the filling completion time and the release time, the transmission control section 89 controls the transmission of a transfer permission signal relative to second write data received after the first write data such that the period in which the write buffer memory WB becomes full is less than or equal to the third threshold (including a condition that the period in which the write buffer memory WB is full is zero). For example, the transmission control section 89 delays a timing of transmitting a transfer permission signal in the equalized reception mode such that the write buffer memory WB is not full, compared to a timing of the normal reception mode which immediately permits transfer of write data based on determination that data can be stored in the write buffer memory WB.

Specifically, when the normal reception mode is selected, and free space for storing the write data in the write buffer memory WB is generated, the transmission control section 89 instructs the transmission section 86 to immediately-transmit, to the information processing device 2 which is a transmission source of a write command, a transfer permission signal with respect to a write command.

The transmission control section 89 instructs the transmission section 86 to transmit a transfer permission signal for receiving data from the information processing device 2 at the equalized receiving speed calculated by the third calculation section 87*c* when the equalized reception mode is selected. In other words, the transmission control section 89 controls transmission of a transfer permission signal by controlling the size of write data permitted to be transmitted using the transfer permission signal and the transmission timing or interval of the transfer permission signal, such that the data reception amount for each time unit matches the equalized receiving speed; in other words, such that write data is received at the equalized receiving speed.

In the present embodiment, in the normal reception mode, the memory system 3 immediately transmits a transfer permission signal corresponding to a write command of write data to the information processing device 2 after the memory system 3 receives the write command from the information processing device 2. In other words, in the normal reception mode, the memory system 3 transmits a transfer permission signal of write data having the size of free space in the write buffer memory WB to the information processing device 2 when a write command is received.

In the equalized reception mode, the memory system 3 does not immediately transmit a transfer permission signal of write data even if free space is present in the write buffer memory WB after the memory system 3 receives a write command from the information processing device 2. In the equalized reception mode, the memory system 3 transmits a transfer permission signal based on an instruction of the transmission control section 89. In other words, in the equalized reception mode, the memory system 3 adjusts speed at which write data is filled in the write buffer memory WB, and transmits a transfer permission signal, such that the filling completion time of the write buffer memory WB is the same as the release time.

Various processes of the memory system 3 according to the present embodiment are described hereinafter.

FIG. 2 is a flowchart showing an example of a data storing process to the write buffer memory WB by the memory system 3 according to the present embodiment.

In step 201, the reception section 81 receives a write command from the information processing device 2 via the interface unit 6.

In step 202, the first calculation section 87*a* calculates the time (filling completion time) when the write buffer memory WB runs out of free capacity as a result of storing the write data in the write buffer memory WB. For example, the first calculation section 87*a* calculates the filling completion time of the write buffer memory WB when data is filled in the write buffer memory WB and the write buffer memory WB runs out of free space, based on the receiving speed of the memory system 3 detected by the receiving speed detection section 85 and the free capacity of the write buffer memory WB.

In step 203, the second calculation section 87*b* calculates the release time when free space is generated in the write buffer memory WB by writing the data temporarily stored in the write buffer memory WB to the nonvolatile memory 5. For example, the second calculation section 87*b* calculates the release time of the write buffer memory WB, based on the gear ratio and the throttling setting.

In step 204, the selection section 88 compares the filling completion time of the write buffer memory WB calculated by the first calculation section 87*a* with the release time of the write buffer memory WB calculated by the second calculation section 87*b*.

When the filling completion time and the release time of the write buffer memory WB are the same, or the release time is earlier than the filling completion time, the selection section 88 selects the normal reception mode in step 205.

When the normal reception mode is selected, the transmission control section 89 determines whether or not the write buffer memory WB has free space in step 206.

When no free space is left in the write buffer memory WB, the process returns to step 206.

When the write buffer memory WB has free space, the process proceeds to step 207.

In step 207, the transmission control section 89 instructs the transmission section 86 to transmit a transfer permission signal indicating that write data is permitted to be transferred to the write buffer memory WB. The transmission section 86 transmits the transfer permission signal to the information processing device 2 via the interface unit 6.

In step 208, the reception section 81 receives the write data from the information processing device 2 via the interface unit 6. The write section 83 stores the received write data in the write buffer memory WB.

In step 209, the address translation section 82 updates the address translation table 71 based on the logical address of the write data and the physical address of the write buffer memory WB.

In step 210, the transmission control section 89 determines whether or not all write data having the data size specified by the write command is received.

When not all write data are received, the process returns to step 206.

When all write data are received, the process proceeds to step 220.

When the release time of the write buffer memory WB is determined to be later than the filling completion time of the write buffer memory WB in step 204, the selection section 88 selects the equalized reception mode in step 211.

When the equalized reception mode is selected, the third calculation section 87*c* calculates the equalized receiving speed in step 212. For example, the third calculation section 87*c* obtains the equalized receiving speed by dividing the size of the free space of the write buffer memory WB by the time period from the current time to the release time of the write buffer memory WB.

In step 213, the transmission control section 89 determines the size of data which is permitted to be transferred by a transfer permission signal and the transmission timing of the transfer permission signal based on the calculated equalized receiving speed.

In step 214, the transmission control section 89 determines whether or not it is transmission timing.

If it is not the transmission timing, the process returns to step 214.

If it is the transmission timing, the transmission control section 89 determines whether or not the write buffer memory WB has free space in step 215.

When no free space is left in the write buffer memory WB, the process returns to step 215.

When the free space is left in the write buffer memory WB, the process proceeds to step 216.

In step 216, the transmission control section 89 instructs the transmission section 86 to transmit a transfer permission signal indicating that write data having the determined data size is permitted to be transferred to the write buffer memory WB. The transmission section 86 transmits the transfer permission signal to the information processing device 2 via the interface unit 6.

In step 217, the reception section 81 receives the write data from the information processing device 2 via the interface unit 6. The write section 83 stores the received write data in the write buffer memory WB.

In step 218, the address translation section 82 updates the address translation table 71 based on the logical address of the write data and the physical address of the write buffer memory WB.

In step 219, the transmission control section 89 determines whether or not all write data having the data size specified by the write command is received.

When not all write data are received, the process returns to step 214.

When all write data are received, the process proceeds to step 220.

When all write data having the data size specified by the write command is received, the transmission control section 89 transmits an acknowledgement signal indicating that the process corresponding to the write command has been completed, to the information processing device 2 via the interface unit 6, using the transmission section 86 in step 220.

FIG. 3 is a flowchart showing an example of the host writing operation for transferring data in the write buffer memory WB to the nonvolatile memory 5 by the memory system 3 according to the present embodiment.

In step 301, the write section 83 writes, to the nonvolatile memory 5, data which is stored in the write buffer memory WB and has not been written to the nonvolatile memory 5 (that is, data in a dirty buffer area).

In step 302, the address translation section 82 updates the address translation table 71 based on the logical address of the data written to the nonvolatile memory 5 and the physical address of the nonvolatile memory 5.

In step 303, the write section 83 releases the area of the write buffer memory WB in which the data transferred to the nonvolatile memory 5 was stored.

FIG. 4 is a flowchart showing an example of a compaction process according to the present embodiment.

In step 401, the compaction section 84 allocates an area in the compaction buffer memory CB.

In step 402, the compaction section 84 stores valid data written in a compaction target block to the compaction buffer memory CB.

In step 403, the compaction section 84 transfers the data in the compaction buffer memory CB to the nonvolatile memory 5.

In step 404, the compaction section 84 releases the area of the compaction buffer memory CB.

In step 405, the address translation section 82 updates the address translation table 71 based on the logical address of the data moved through the compaction process and the physical address after the compaction process.

Next, a function of the memory system 3 and its effect according to the present embodiment are described.

In the present embodiment, command latency is, for example, the period from reception of a command to transmission of an acknowledgement signal indicating process completion.

The memory system 3 can reduce variation in write command latency in a write cache operation.

In the present embodiment, the write command latency is, for example, the period from when the memory system 3 receives a write command from the information processing device 2 to when the memory system 3 provides the information processing device 2 with an acknowledgement signal indicating command completion. The memory system 3 turns to a wait state until free space is generated in the write buffer memory WB, transmits a transfer permission signal if free space is generated in the write buffer memory WB, and stores the received write data in the write buffer memory WB. Flow control refers to the following control: the memory system 3 is in a wait state until free space is generated in the write buffer memory WB, and the memory system 3 transmits a transfer permission signal if free space is generated in the write buffer memory WB.

In the present embodiment, the data of the write buffer memory WB is written to the nonvolatile memory 5 in the background. The write buffer memory WB may become full if a state where the amount of data stored in the write buffer memory WB is larger than the amount of data written to the nonvolatile memory 5 is maintained for some time period. Free space is generated in the write buffer memory WB by writing data in the write buffer memory WB to the nonvolatile memory 5. When the free space is generated in the write buffer memory WB, the memory system 3 can receive write data again.

Figure 5:
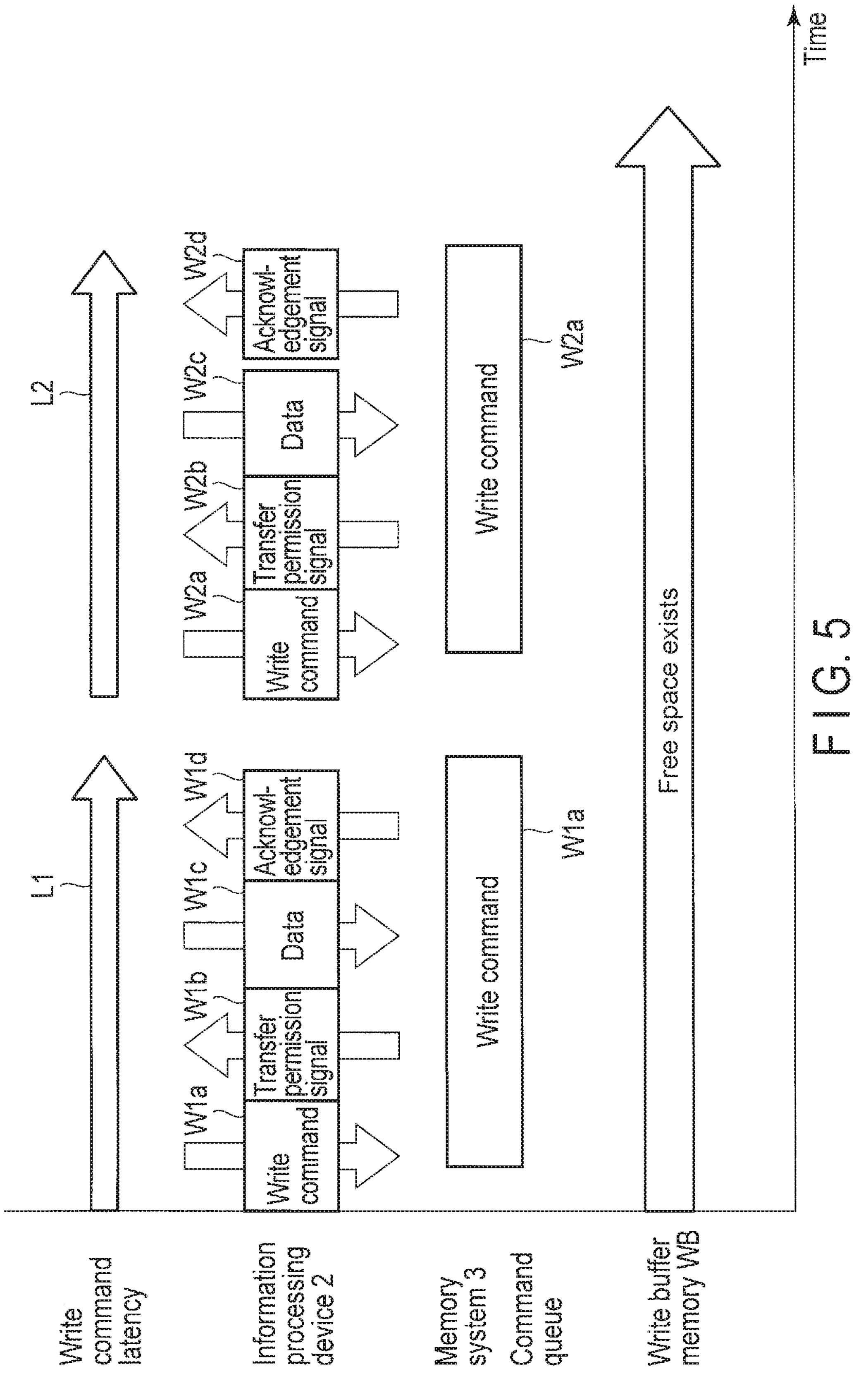
FIG. 5 is a timing chart showing write command latency when the write buffer memory includes free space.

FIG. 5 is a timing chart showing a write command latency when the write buffer memory WB includes free space.

The memory system 3 receives a write command W1*a* when the write buffer memory WB includes free space.

Subsequently, the front end FE of the memory system 3 stores the write command W1*a* in a command queue.

When the write buffer memory WB includes free space, the write command W1*a* in the command queue is immediately executed. The memory system 3 transmits, to the information processing device 2, a transfer permission signal W1*b* corresponding to the write command W1*a*.

The memory system 3 receives, from the information processing device 2, data W1*c* corresponding to the transfer permission signal W1*b*.

The memory system 3 transmits, to the information processing device 2, an acknowledgement signal W1*d* corresponding to the write command W1*a* and retires the write command W1*a* in the command queue.

In this case, write command latency L1 is the period from when the memory system 3 receives the write command W1*a* to when the memory system 3 provides the information processing device 2 with the acknowledgement signal W1*d*.

Subsequently, the memory system 3 receives a write command W2*a* when the write buffer memory WB includes free space.

Processing and write command latency L2 in the memory system 3 when the write command W2*a* is received are the same as processing and the write command latency L1 in the memory system 3 when the write command W1*a* is received as described above. Therefore, the explanation of the processing and the write command latency L2 in the memory system 3 when the write command W2*a* is received is omitted.

FIG. 6 is a timing chart showing a write command latency when the write buffer memory WB is changed from a full state to a state in which the write buffer memory WB has free space.

The memory system 3 receives the write command W1*a* in a state where no free space is left in the write buffer memory WB.

Subsequently, the front end FE of the memory system 3 stores the write command W1*a* in the command queue.

When no free space is left in the write buffer memory WB, the write command W1*a* is maintained in the command queue (wait state).

Subsequently, the memory system 3 receives the write command W2*a* in a state where no free space is left in the write buffer memory WB.

Subsequently, the front end FE of the memory system 3 stores the write command W2*a* in the command queue.

If free space is generated in the write buffer memory WB, the memory system 3 executes the write command W1*a* stored in the command queue and transmits, to the information processing device 2, the transfer permission signal W1*b* corresponding to the write command W1*a*.

The memory system 3 receives, from the information processing device 2, the data W1*c* corresponding to transfer permission signal W1*b*.

Then, the memory system 3 transmits, to the information processing device 2, the acknowledgement signal W1*d* corresponding to the write command W1*a* and retires the write command W1*a* in the command queue.

The write command latency L1 is the period from when the memory system 3 receives the write command W1*a* to when the memory system 3 provides the information processing device 2 with the acknowledgement signal W1*d*. The write command latency L1 is increased by the time period while the write command W1*a* waits for being processed.

Subsequently, the memory system 3 executes the write command W2*a* stored in the command queue in a state where the write buffer memory WB includes free space and transmits, to the information processing device 2, the transfer permission signal W2*b* corresponding to the write command W2*a*.

The memory system 3 receives, from the information processing device 2, the data W2*c* corresponding to the transfer permission signal W2*b*.

The memory system 3 transmits, to the information processing device 2, the acknowledgement signal W2*d* corresponding to the write command W2*a* and retires the write command W2*a* in the command queue.

The write command latency L2 is the period from when the memory system 3 receives the write command W2*a* to when the memory system 3 provides the information processing device 2 with the acknowledgement signal W2*d*. The write command latency L2 is increased by the time period while the write command W2*a* waits for being processed.

In this manner, the write commands W1*a* and W2*a* which are stored in the command queue in a state where no free space is left in the write buffer memory WB are in a wait state until, for example, free space corresponding to the write commands W1*a* and W2*a* is generated in the write buffer memory WB.

In a state where no free space is left in the write buffer memory WB, a number of write commands up to a predetermined value (for example, a Queue Depth [QD]) are received and held in a wait state. For example, with regard to the write command W2*a* which is received in a state where no free space is left in the write buffer memory WB, the sum of the period from when the write command W2*a* is received to when free space is generated in the write buffer memory WB, the period required to process the write command W1*a* in a wait state which is received before the write command W2*a*, and the period required to process the write command W2*a* corresponds to the write command latency L2 of the write command.

To reduce the write command latency, the QD may be set to be smaller.

Figure 7:
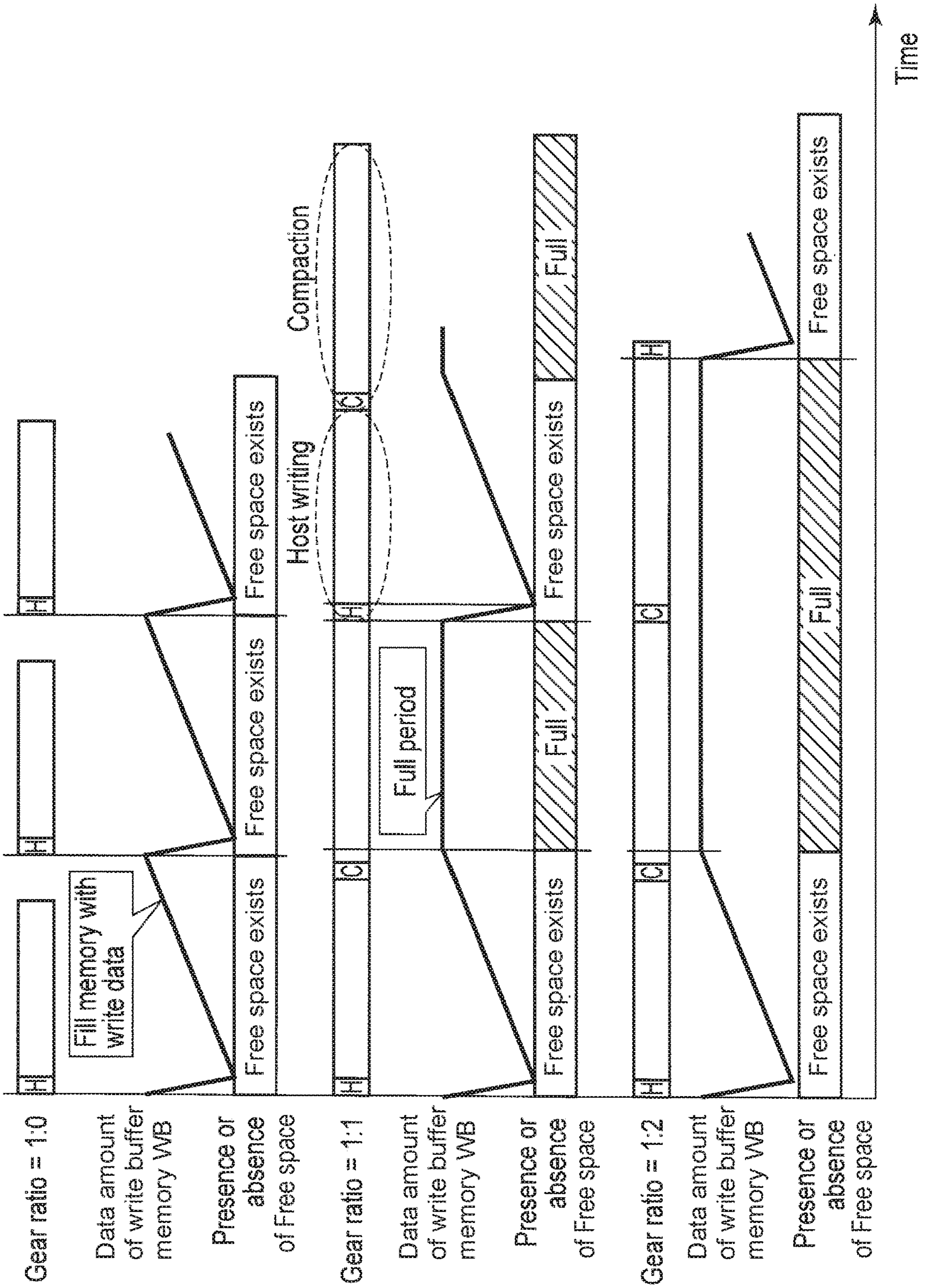
FIG. 7 is a timing chart showing a relationship of a gear ratio (frequency ratio), an amount of data stored in the write buffer memory, and a presence or absence of free space in the write buffer memory when an information processing device operates at a full performance level.

FIG. 7 is a timing chart showing an example of a relationship of a gear ratio, an amount of data stored in the write buffer memory WB, and a presence or absence of free space in the write buffer memory WB, when write data is received from the information processing device 2 at a maximum transfer speed as soon as free space is generated in the write buffer memory WB.

The memory system 3 executes the host writing operation and compaction in a writing operation.

For example, the host writing operation refers to writing, to the nonvolatile memory 5, write data received from the information processing device 2.

Compaction refers to moving valid data in the nonvolatile memory 5 to generate a free block in the nonvolatile memory 5. Instead of compaction, garbage collection may be performed.

FIG. 7 shows a case of the gear ratio “1:0” in which no compaction is executed for one host writing operation, a case of the gear ratio “1:1” in which one compaction (e.g., one-page writing per one compaction) is executed for one host writing operation (e.g., one-page writing per one host writing operation), and a case of the gear ratio “1:2” in which two compaction processes (e.g., one-page writing per one compaction process) are executed for one host writing operation (e.g., one-page writing per one host writing operation).

The release of the write buffer memory WB is performed through the host writing operation.

When compaction is executed between a host writing operation and the next host writing operation, the period until the release of the write buffer memory WB is lengthened.

As shown in FIG. 7, when the write data corresponding to the free space in the write buffer memory WB is received at the maximum transfer speed from the information processing device 2, and compaction is executed with a high frequency, the period during which the write buffer memory WB is full is increased. As a result, the latency of a write command which is received in a state where the write buffer memory WB is full is increased.

Thus, the dispersion of the latency among write commands may be large.

Figure 8:
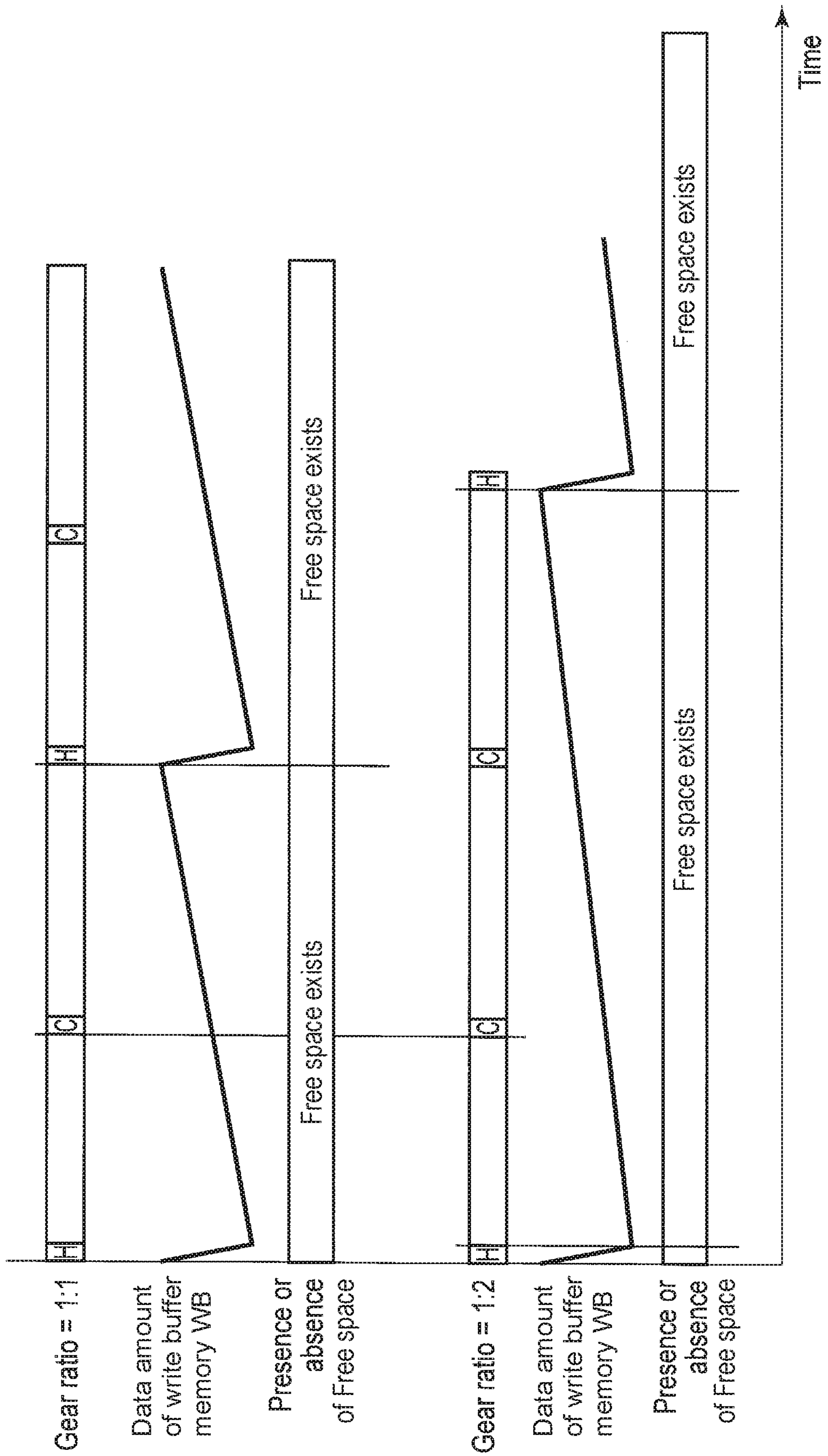
FIG. 8 is a timing chart showing a relationship of a gear ratio (frequency ratio), an amount of data stored in the write buffer memory, and a presence or absence of free space in the write buffer memory during an equalized reception mode according to the first embodiment.

FIG. 8 is a timing chart showing an example of a relationship of a gear ratio, an amount of data stored in the write buffer memory WB, and a presence or absence of free space in the write buffer memory WB in the equalized reception mode according to the present embodiment.

In the equalized reception mode, next release time of the write buffer memory WB is predicted, and an increase pace of the amount of data in the write buffer memory WB is calculated. In the equalized reception mode, a pace at which the memory system 3 receives write data transmitted from the information processing device 2 is controlled, such that the data storage area of the write buffer memory WB is released at the time when the write buffer memory WB is full or before the time. In this manner, it is possible to nearly eliminate the period in which the write buffer memory WB is full.

As described above, in the equalized reception mode of the present embodiment, the memory system 3 does not immediately transmit a transfer permission signal to the information processing device 2 and equalizes periods for transmitting the transfer permission signals to the information processing device 2 depending on a situation when the write buffer memory WB includes free space.

In the equalized reception mode of the present embodiment, next time when the write buffer memory WB becomes full and time when free space is generated in the write buffer memory WB again are predicted based on the gear ratio and/or the throttling setting. In the present embodiment, period during which the memory system 3 cannot receive a command or data from the information processing device 2 because the write buffer memory WB is full, is reduced.

In the present embodiment, reception of necessary write data is completed by the next host writing operation.

In this manner, according to the present embodiment, it is possible to reduce the variation of write command latency and throughput of the memory system 3.

For example, the present embodiment may be applied to Redundant Arrays of Inexpensive Disks (RAID) which collectively manage a plurality of memory systems 3 as a single device. For example, when the information processing device 2 accesses RAID including a plurality of memory systems 3, and the write command latency of one of the memory systems 3 is increased, and the performance of the RAID is reduced as a whole. However, in the present embodiment, the variation of write command latency of a plurality of memory systems 3 can be reduced. Thus, it is possible to improve performance of the RAID.

Second Embodiment

A second embodiment is a modification example of the first embodiment.

In the second embodiment, to reduce protocol overhead, the minimum size of write data permitted to be transferred by a transmission control section 89 is large (for example, greater than a fourth threshold). In the present embodiment, the data size may be referred to as granularity.

In the present embodiment, the transmission control section 89 adjusts the minimum size of write data permitted to be transferred by the transmission control section 89 so as to improve the efficiency of data transfer from an information processing device 2 to a memory system 3. Here, the transmission control section 89 may execute write data transfer with a size larger than a size (release granularity) at which a write buffer memory WB is released.

Figure 9:
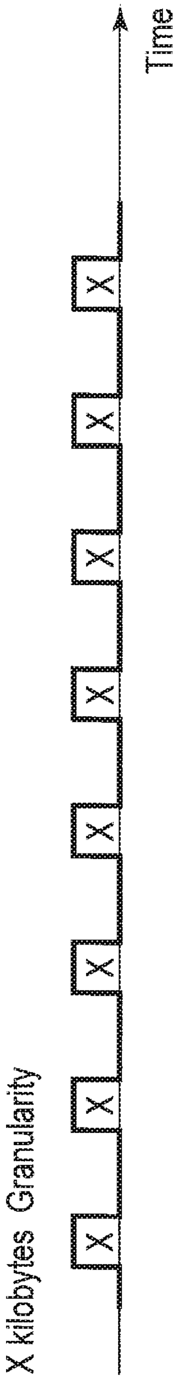
FIG. 9 is a timing chart showing a transmission state of a transfer permission signal which permits data transfer with a granularity of data size X kilobytes.

FIG. 9 is a timing chart showing an example of a transmission state of a transfer permission signal which permits data transfer with a granularity of data size X kilobytes. In FIG. 9, for example, data having a size specified by a write command is transferred by X kilobytes less than a predetermined value. The granularity of data permitted to be transferred is X kilobytes and the transfer cycle of transfer permission signals is short. In this case, the throughput of data transfer from the information processing device 2 to the memory system 3 may be reduced because of protocol overhead. The interface (a physical connection) may be uselessly occupied, and hence another communication between another host and the drive (or the host and another drive) over the same interface may be blocked.

Figure 10:
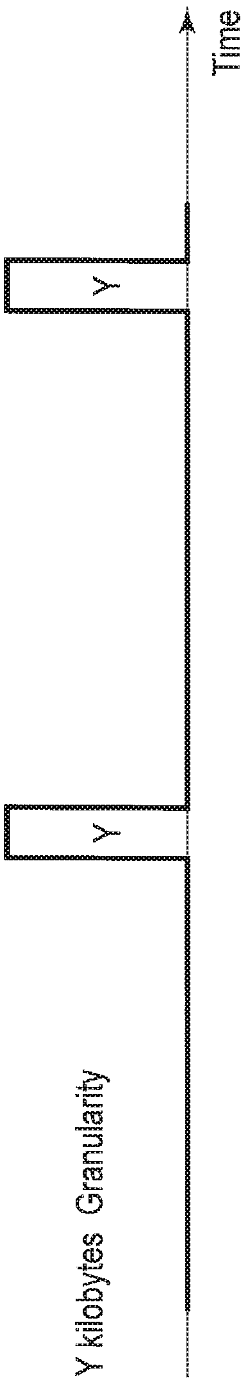
FIG. 10 is a timing chart showing a transmission state of a transfer permission signal which permits data transfer with a granularity of data size Y kilobytes.

FIG. 10 is a timing chart showing an example of a transmission state of a transfer permission signal which permits data transfer with a granularity of data size Y kilobytes. In FIG. 10, for example, data having a size specified by a write command is transferred by Y kilobytes greater than or equal to a predetermined value. The granularity of data permitted to be transferred is Y kilobytes and the transfer cycle of transfer permission signals is long. The granularity of a transfer permission signal of FIG. 10 is more effective in transfer than the granularity of a transfer signal of FIG. 9.

Therefore, the transmission control section 89 performs a control process, such that the granularity of data permitted to be transferred is Y kilobytes greater than or equal to a predetermined value, by putting an issuance of a transfer permission signal in a wait state. To improve efficiency in data transfer, the transmission control section 89 may performs a control process, such that the minimum unit of flow control is greater than the release granularity of the write buffer memory WB in the memory system 3.

In the present embodiment, transfer efficiency can be improved by controlling the size of data transferred from the information processing device 2 to the memory system 3.

Third Embodiment

In a third embodiment, a specific structure of an information processing system 1 described in the first and second embodiments is described.

Figure 11:
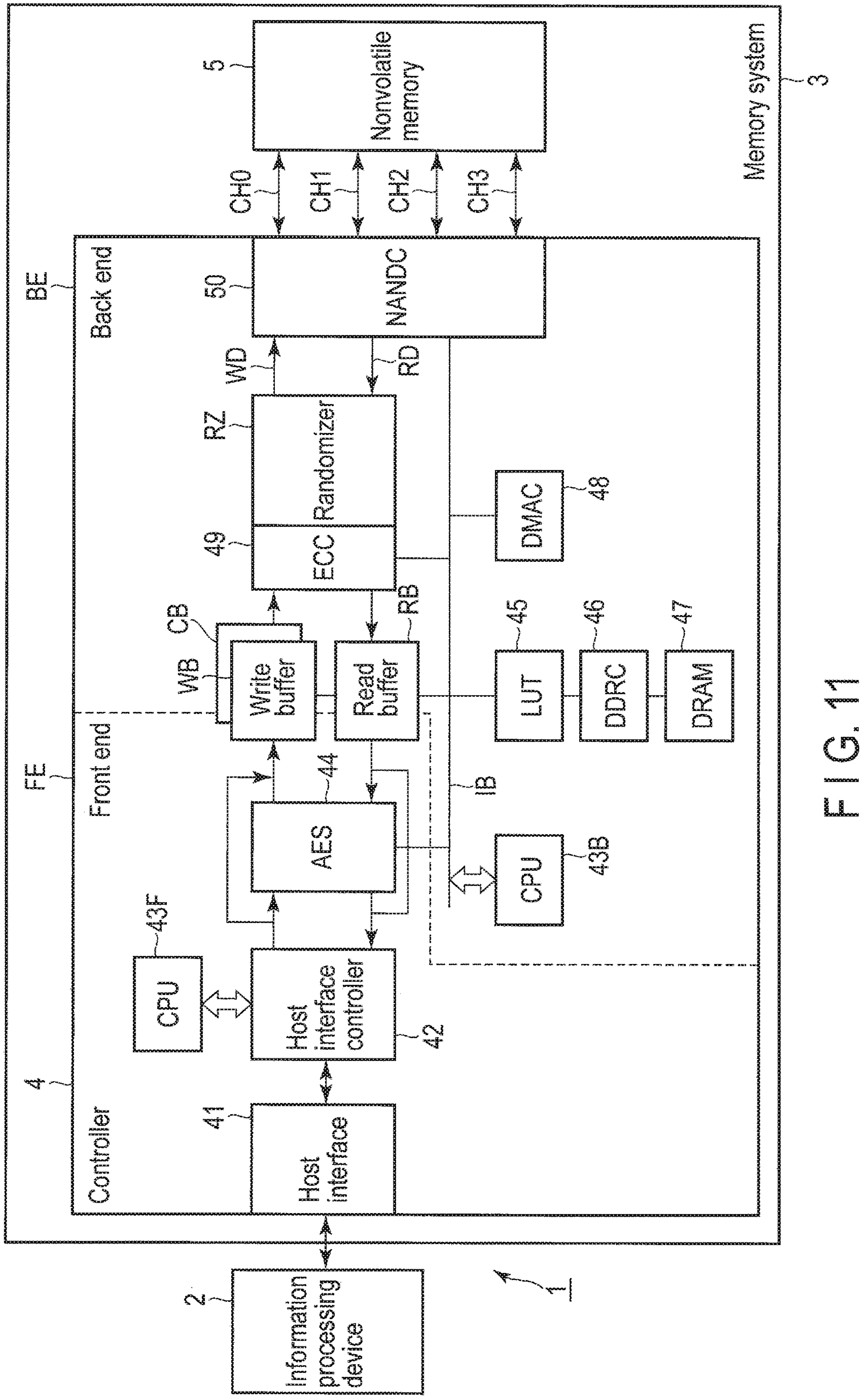
FIG. 11 is a block diagram of an information processing system according to a third embodiment.

FIG. 11 is a block diagram of an information processing system 1 according to the third embodiment.

The information processing system 1 includes the information processing device 2 and a memory system 3.

The processor 8 in the memory system 3 according to the first and second embodiment corresponds to a central processing unit (CPU) 43B. The interface unit 6 corresponds to a host interface 41. The memory units 7A and 7B correspond to a DRAM 47. The address translation table 71 corresponds to an LUT 45. The memory controller 9 corresponds to a AND controller (NANDC) 50. The information processing device 2 functions as a host device of the memory system 3.

A controller 4 of the memory system 3 includes a front end FE and a back end BE. The front end (host communication unit) FE includes a host interface 41, a host interface controller 42, an encrypt/decrypt unit (Advanced Encryption Standard (AES)) 44, and a CPU 43F.

The host interface 41 communicates requests (WRITE command, READ command, UNMAP command, TRIM command, and FORMAT command), LBA, and data with the information processing device 2.

The host interface controller (control unit) 42 controls the communication of the host interface 41 based on the control of the CPU 43F.

The encrypt/decrypt unit 44 encrypts write data (plaintext) transmitted from the host interface controller 42 during a data write operation. The encrypt/decrypt unit 44 decrypts the encrypted read data transmitted from the read buffer RB of the back end BE during a data read operation. Here, the transmission of the write data and the read data can be performed without using the encrypt/decrypt unit 44 as occasion demands.

The CPU 43F controls the above components 41, 42, and 44 of the front end FE to control the whole function of the front end FE.

The back end (memory communication unit) BE includes a write buffer memory WB, compaction buffer memory CB, read buffer memory RB, LUT 45, DDRC 46, DRAM 47, DMAC 48, ECC 49, randomizer RZ, NANDC 50, and CPU 43B.

The write buffer memory (write data transfer unit) WB stores write data transmitted from the information processing device 2 temporarily. Specifically, the write buffer WB temporarily stores data until the size of the write data reaches a predetermined data size suitable for writing in the nonvolatile memory 5.

The read buffer memory (read data transfer unit) RB stores read data read from the nonvolatile memory 5 temporarily. Specifically, the order of the read data is rearranged to be an order suitable for the information processing device 2 (the order of the logical address LBA designated by the information processing device 2) in the read buffer memory RB.

The compaction buffer memory CB temporarily stores data at the time of compaction.

The LUT 45 is a table to translate a logical address LBA into a physical address PBA.

The DDRC 46 controls double data rate (DDR) in the DRAM 47.

The DRAM 47 is a nonvolatile memory which stores, for example, the LUT 45.

The direct memory access controller (DMAC) 48 transfers write data and read data through an internal bus IB. In FIG. 11, only a single DMAC 48 is shown; however, the controller 4 may include two or more DMACs 48. The DMAC 48 may be set in various positions inside the controller 4.

The ECC 49 adds an error correction code (ECC) to the write data transmitted from the write buffer memory WB. When the read data is transmitted to the read buffer memory RB, the ECC 49, if necessary, corrects the read data read from the nonvolatile memory 5 using the added ECC.

The randomizer RZ (or scrambler) is configured to equalize frequency of being programmed as 1 and as 0 for each cell (wear leveling for each cell) and to suppress unevenness in the numbers of 1 and 0 within a page (reduction of interference between cells or between pages, and equalization). By use of the randomizer, the number of times of write operation can be leveled, and the lifetime of a memory cell MC of the nonvolatile memory 5 can be extended. As a result, the reliability of the nonvolatile memory 5 can be improved. Furthermore, the randomizer RZ restores, during the data read operation, original data by executing an inverse process of the randomizing process for the data writing.

The NANDC 50 uses a plurality of channels (four channels CH0 to CH3 in FIG. 11) to access the nonvolatile memory 5 in parallel in order to satisfy a demand for a certain speed.

The CPU 43B controls each component above (45 to 50, and RZ) of the back end BE to control the whole operation of the back end BE.

The protocol used in communication between the memory system 3 and the information processing device 2 may be, for example, Serial Attached SCSI (SAS) or PCI Express (PCIe) for a physical layer protocol, and NVM Express (NVMe) or Advanced Host Controller Interface (AHCI) for an upper-layer protocol that works over the physical layer protocol.

In the first and second embodiments, the pace at which the memory system 3 receives write data from the information processing device 2 is controlled by controlling the timing of transmitting a transfer permission signal (XFER RDY) from the memory system 3 to the information processing device 2 according to, for example, an SAS interface. However, for example, similar control may be performed when data is received and transmitted inside the memory system 3 according to an NVMe interface. More specifically, for example, the pace of storing write data transmitted from the front end FE in the write buffer memory WB may be controlled by a method similar to the methods of the first and second embodiments when write data to be stored in the write buffer memory WB is received and transmitted between the front end FE and the back end BE. In this manner, the latency viewed from outside of the memory system 3 can be equalized. Here, a structure of the controller 4 is not limited to the structure shown in FIG. 11.

Figure 12:
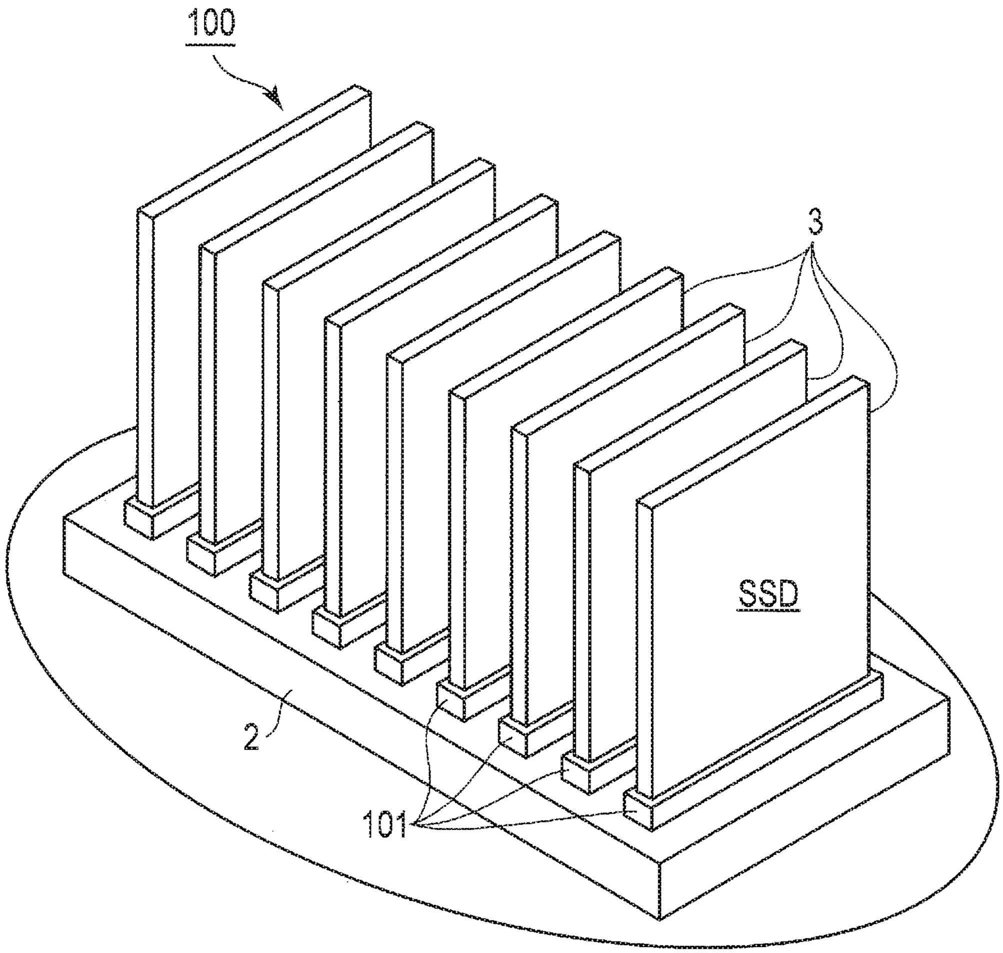
FIG. 12 is a perspective view of a storage system according to the third embodiment.

FIG. 12 is a perspective view of a storage system according to the present embodiment.

A storage system 100 includes the memory system 3 as an SSD.

The memory system 3 is, for example, a relatively small module. Here, the size and scale of the memory system 3 may be changed arbitrarily.

Furthermore, the memory system 3 may be applicable to the information processing device 2 as a server used in a data center or a cloud computing system employed in a company (enterprise) or the like. Thus, the memory system 3 may be an enterprise SSD (eSSD).

The memory system 3 includes a plurality of connectors (for example, slots) 101 opening upwardly, for example. Each connector 101 is a connector or the like. With the SAS connector, a high speed mutual communication can be established between the information processing device 2 and each memory system 3.

A plurality of memory systems 3 is individually attached to the connectors 101 of the information processing device 2 and supported such that they stand in an approximately vertical direction. Using this structure, a plurality of memory systems 3 can be mounted collectively in a compact size, and the memory systems 3 can be miniaturized. Furthermore, the shape of each memory system 3 of the present embodiment is 2.5 inch small form factor (SFF). With this shape, the memory system 3 can be compatible with an enterprise HDD (eHDD) and compatibility with the eHDD can be achieved.

Here, the memory system 3 is not limited to the use in an enterprise. For example, the memory system 3 can be used as a memory medium of a consumer electronic device such as a notebook portable computer or a tablet terminal.

As can be understood from the above, the information processing system 1 and the storage system 100 having the structure described in the present embodiment can have a mass storage capacity in addition to the same advantages of the first and second embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system, comprising:
a nonvolatile memory;
a buffer memory; and
a controller configured to receive a write command from a host, send a permission signal to the host in response to receiving the write command, receive write data associated with the write command that the host sent in response to the permission signal, store the write data into the buffer memory, and transfer the write data stored in the buffer memory to the nonvolatile memory, wherein
the controller is configured to:
calculate a first timing at which the buffer memory will become full and a second timing at which space will become available in the buffer memory; and
control a timing of sending the permission signal on the basis of the first timing and the second timing, such that the buffer memory stays being full for no longer than a predetermined length of time due to the write data stored in the buffer memory.

2. The memory system according to claim 1, wherein
the controller calculates the first timing on the basis of remaining space of the buffer memory and a data transfer speed of data from the host.

3. The memory system according to claim 1, wherein the predetermined length of time is zero.

4. The memory system according to claim 1, wherein
the controller is further configured to carry out a garbage collection operation to aggregate a plurality of fractions of valid data in the nonvolatile memory into a single fraction of valid data, and calculate the second timing on the basis of (i) a length of time taken to transfer write data stored in the buffer memory to the nonvolatile memory, (ii) a length of time taken to carry out the garbage collection operation, and (iii) a frequency ratio of the transfer of write data from the buffer memory to the nonvolatile memory with respect to transfer of valid data to the nonvolatile memory during the garbage collection operation.

5. The memory system according to claim 4, wherein
the controller is further configured to control the buffer memory to have free space when the controller starts to carry out the garbage collection operation, and become substantially full when the controller ends the garbage collection operation and the transfer of write data from the buffer memory starts.

6. The memory system according to claim 1, wherein
when the first timing is later than the second timing, the controller transmits the permission signal at a third timing, and
when the second timing is later than the first timing, the controller transmits the permission signal at a fourth timing that is later than the third timing.

7. The memory system according to claim 6, wherein when the second timing is later than the first timing, the controller communicates to the host a designated data size of write data that are allowed to be transmitted from the host together with the permission signal.

8. The memory system according to claim 7, wherein when the designated data size is smaller than a size of the write data corresponding to the write command, the controller transmits a second permission signal, after the controller receives write data of the designated data size and a sufficient space becomes available in the buffer memory.

9. The memory system according to claim 7, wherein the designated data size is greater than a unit size of space in the buffer memory that is released.

10. A storage system comprising:
a memory system; and
a host configured to access the memory system, wherein the memory system includes:
a nonvolatile memory;
a buffer memory; and
a controller configured to receive a write command from the host, send a permission signal to the host in response to receiving the write command, receive write data associated with the write command that the host sends in response to the permission signal, store the write data into the buffer memory, and transfer the write data stored in the buffer memory to the nonvolatile memory, wherein
the controller is configured to:
calculate a first timing at which the buffer memory will become full and a second timing at which space will become available in the buffer memory; and
control a timing of sending the permission signal on the basis of the first timing and the second timing, such that the buffer memory stays being full for no longer than a predetermined length of time due to the write data stored in the buffer memory.

11. The storage system according to claim 10, wherein the controller calculates the first timing on the basis of remaining space of the buffer memory and a data transfer speed of data from the host.

12. The storage system according to claim 10, wherein the predetermined length of time is zero.

13. The storage system according to claim 10, wherein the controller is further configured to carry out a garbage collection operation to aggregate a plurality of fractions of valid data in the nonvolatile memory into a single fraction of valid data, and calculates the second timing on the basis of (i) a length of time taken to transfer write data stored in the buffer memory to the nonvolatile memory, (ii) a length of time taken to carry out the garbage collection operation, and (iii) a frequency ratio of the transfer of write data from the buffer memory to the nonvolatile memory with respect to transfer of valid data to the nonvolatile memory during the garbage collection operation.

14. The storage system according to claim 13, wherein the controller is further configured to control the buffer memory to have free space when the controller starts to carry out the garbage collection operation, and become substantially full when the controller ends the garbage collection operation and the transfer of write data from the buffer memory starts.

15. The storage system according to claim 10, wherein when the first timing is later than the second timing, the controller transmits the permission signal at a third timing, and
when the second timing is later than the first timing, the controller transmits the permission signal at a fourth timing that is later than the third timing.

16. The storage system according to claim 15, wherein when the second timing is later than the first timing, the controller communicates to the host a designated data size of write data that are allowed to be transmitted from the host together with the permission signal.

17. The storage system according to claim 16, wherein when the designated data size is smaller than a size of the write data corresponding to the write command, the controller transmits a second permission signal, after the controller receives write data of the designated data size and a sufficient space becomes available in the buffer memory.

18. The storage system according to claim 16, wherein the designated data size is greater than a unit size of space in the buffer memory that is released.

* * * * *